United States Patent [19]
Gore

[11] Patent Number: 5,976,232
[45] Date of Patent: Nov. 2, 1999

[54] HOMOGENIZATION PROCESS FOR INK-JET INKS CONTAINING FINE DISPERSIONS OF PIGMENTS

[75] Inventor: Makarand P. Gore, Corvallis, Oreg.

[73] Assignee: Hewlett-Packard Company, Palo Alto, Calif.

[21] Appl. No.: 09/070,857

[22] Filed: Apr. 30, 1998

[51] Int. Cl.$^6$ .................................................. C09D 11/02
[52] U.S. Cl. ..................................... 106/31.65; 106/31.85
[58] Field of Search ............................. 106/31.65, 31.85

[56] References Cited

U.S. PATENT DOCUMENTS

| | | | |
|---|---|---|---|
| 4,081,863 | 3/1978 | Rees | 366/176 |
| 4,221,692 | 9/1980 | Lambertini et al. | 260/37 |
| 4,319,848 | 3/1982 | Lambertini et al. | 366/136 |
| 4,352,573 | 10/1982 | Pandolfe | 366/176 |
| 4,383,769 | 5/1983 | Pandolfe | 366/337 |
| 4,585,357 | 4/1986 | Ogata | 366/176 |
| 4,773,833 | 9/1988 | Wilkinson et al. | 417/539 |
| 4,952,067 | 8/1990 | Dallas | 366/337 |
| 5,026,427 | 6/1991 | Mitchell et al. | 106/31.6 |
| 5,232,726 | 8/1993 | Clark et al. | 426/519 |
| 5,273,407 | 12/1993 | Jarchau et al. | 417/539 |
| 5,310,778 | 5/1994 | Shor et al. | 106/31.65 |
| 5,366,287 | 11/1994 | Verstallen | 366/173 |
| 5,443,628 | 8/1995 | Loria et al. | 106/31.65 |
| 5,482,369 | 1/1996 | Verstallen | 366/162.4 |
| 5,498,075 | 3/1996 | Jarchau et al. | 366/176.2 |
| 5,538,549 | 7/1996 | Kato et al. | 106/31.65 |
| 5,620,730 | 4/1997 | van Noort | 426/399 |
| 5,679,138 | 10/1997 | Bishop et al. | 106/31.65 |
| 5,843,220 | 12/1998 | Babler | 106/31.75 |

OTHER PUBLICATIONS

Gaulin, Rannie, APV Homogenizer Group, "Processing Of Emulsions And Dispersions By Homogenization" handbook, No. 3850.00, pp. 1–25, 1996, no month available.

*Primary Examiner*—Helene Klemanski
*Attorney, Agent, or Firm*—Michael D. Jones

[57] ABSTRACT

The ink of the invention comprises a vehicle and a colorant. The colorant is a pigment that has been treated to reduce nozzle outs in the inkjet printers. The performance of these pigments is improved by forcing the pigment through an acute pressure valve process wherein the pigment is homogenized to a size of about 0.1 $\mu$m.

14 Claims, No Drawings

HOMOGENIZATION PROCESS FOR INK-JET INKS CONTAINING FINE DISPERSIONS OF PIGMENTS

TECHNICAL FIELD

The present invention relates to pigment-based ink compositions for non-impact ink-jet printing in printers such as Hewlett-Packard's DeskJet printer, large format printers, piezoelectric printers, bubble-jet printers, and textile printers.

BACKGROUND ART

Inks used in non-impact printing, including thermal ink-jet printing, bubble jet printing, piezoelectric printing, and others (collectively referred to herein at ink-jet), typically comprise a colorant and a vehicle, with the vehicle often containing water and other relatively low surface tension liquids. The colorant is typically a dye or pigment.

Pigment-based ink offers a variety of desirable properties over dye-based ink, viz., waterfastness, lightfastness, durability, etc. However, preparation of pigment-based ink-jet inks has not been a widely commercialized due to stability problems of the water insoluble pigments, the tendency of pigments to agglomerate, precipitation or settling of the colorants, and very short dispersion life. Another problem associated with pigment-based inks is the tendency to clog components of the printers such as the nozzles.

The tight tolerances of the nozzles (typically 50 $\mu$m diameter) require that the ink not contain relatively large particles which tend to clog the nozzles, leading to a significant negative impact on the performance of carbon black pigmented inks. Studies have shown that nozzle problems are a potential problem with inks that contain even a very low level of particles ranging is size from about 0.5 to about 2 $\mu$m.

It is believed that even part-per-million (ppm) levels of oversize pigment particles in the ink settle out in the nozzle area. Firing the pen then converts this sediment into a hard mass that cannot be dislodged with servicing or wiping. As stated above, evidence suggests that the size of these particles is on the order of 0.5 $\mu$m to 2 $\mu$m. In theory, a 0.3 micron filtration process should remove these particles. However, the micron rating of filter media can be misleading; filters are typically around 98% efficient, so low concentrations of particles larger than 0.3 $\mu$m do slip through and eventually settle out in the nozzle area. Traditionally, industry has relied upon various techniques, such as filtration, microfluidizers, and high shear mixers, to lessen the problem; unfortunately, the results of using these techniques in manufacturing has produced marginal or moderate degrees of success.

Moreover, the amount of larger particles at the ppm level is very difficult to measure using conventional particle sizing techniques, such as microtrec or nicomp instruments. Therefore, it would be advantageous to have an easy method to measure the level of larger particles present and relate this information to ink performance.

Accordingly, investigations continue into developing ink formulations utilizing pigments which have overcome the problems associated with agglomeration, clogging of nozzles and the presence of large particles, and also provide a reliable method to verify that these particles are not present in an amount sufficient to cause these problems.

DISCLOSURE OF INVENTION

In accordance with this invention, pigment-based inks used in ink-jet printing are provided wherein the inks are improved through the use of an acute pressure valve process which effectively homogenizes the ink. This treatment enhances print performance by producing pigmented ink free of large or agglomerated particles that tend to clog the nozzle, precipitate and settle out in the ink container. Additionally, by producing ink with a narrow, more uniform size distribution of pigment particles, the stability of the ink is improved. A method of ink-jet printing that uses the disclosed inks and exploits the ink's properties is also provided. It has been found that certain commercial, high precision filters can be used to verify that an acceptable level of particle size has been achieved, thereby ensuring improved ink performance.

A particular type of commercially available homogenizers has been unexpectedly found useful for improving the performance of pigment-based inks. The process by which homogenized inks are prepared herein follows. A mixture containing pigment and a "grinding fluid", typically a dispersant/stabilizer mixture or solvent mixture (alternatively the final ink formulations may be homogenized), is forced under high pressure (from about 10,000 psi to about 30,000 psi, preferably from about 13,000 psi to about 29,000 psi, more preferably from about 14,000 psi to about 20,000 psi, even more preferably from about 14,000 psi to 15,000 psi) through a valve with small gap and an impact ring (models are commercially available from RANNIE, such as the RANNIE 8.30H, available from APV Homogenizer Group, Wilmington, Mass. 01887.) to reduce the particle size of the pigments to about 0.1 $\mu$m or below. Depending on the pressure, the pigment particles, and the grinding fluid mixture, the process may be repeated multiple times (from about 2 to about 100, preferably from about 10 to about 50, more preferably from about 20 to about 30) until the desired size is achieved. While not intending to be bound by any theory, it is believed that the high pressure differential between the inlet of the homogenizer valve and the outlet effects high shear and cavitation in the fluid which alters the size and/or solubility properties of the suspended/insoluble pigments in the ink vehicle. It is believed that any conventional homogenizer valve can be used in the practice of this invention as long as the ink that enters the valve is under high enough pressure. It has been found that not only are the relatively large pigments reduced in size, but the overall range in pigment particles sizes is also narrowed, i.e., the pigment particles on average fall within a more narrow range of sizes.

Further, determining that the ink is adequately homogenized and is now suitably homogenized for printing can be accomplished by filtering the ink through certain high precision filters. In contrast to other conventional, commercially available filters, it has been found that high precision nylon filters, such as those available from Micron Separations Inc. Westborough, Mass., can be used to accurately measure the presence of large particles in inks. Further, it has been found that the "ease" of filtration of the ink directly relates to the performance of the ink. By "ease" is meant that the number of these filters needed to filter a set volume of ink directly relates to the performance of the ink. (Fewer filters needed to filter a volume of ink is an accurate predictor that the ink will not clog the printer components, especially the printer nozzle). Thus, one feature of this invention is the method of measuring ink performance (and thereby its suitability for printing) by the use of these high precision filters.

Additionally, because of the high pressures involved, the temperature of the ink may increase, especially with multiple treatments. A cooling stage may be applied between passes through the homogenizer to control temperature and ensure the ink stays below its boiling point.

Homogenizers—Acute pressure valve homogenizers are commercially available. For backgrounds on these homogenizers and procedures for their operation see the following patents, which are hereby incorporated by reference. U.S. Pat. Nos. 5,411,380; 5,273,407; 4,77,833; 4,383,769; 4,352,573; 4,081,863 all assigned to Gaulin Corp. See also 4,585,357; 5,482,369.

Colorants—Water-soluble black chromophores are commercially available from colorant vendors such as Cabot Corp. and Orient Chemical; however, any pigment known in ink-jet printing is useful in the practice of this invention. The following pigments are useful in the practice of the invention; however, this listing is not intended to limit the invention. The following pigments are available from BASF: Paliogen® Orange, Heliogen® Blue L 6901F, Heliogen® Blue NBD 7010, Heliogen® Blue K 7090, Heliogen® Blue L 7101F, Paliogen® Blue L 6470, Heliogen® Green K 8683, and Heliogen® Green L 9140. The following pigments are available from Cabot: Monarch® 1400, Monarch® 1300, Monarch® 1100, Monarch® 1000, Monarch® 900, Monarch® 880, Monarch® 800, and Monarch® 700. The following pigments are available from Ciba-Geigy: Chromophtal® Yellow 3G, Chromophtal® Yellow GR, Chromophtal® Yellow 8G, Igrazin® Yellow 5GT, Igralite® Rubine 4BL, Monastral® Magenta, Monastral® Scarlet, Monastral® Violet R, Monastral® Red B, and Monastral® Violet Maroon B. The following pigments are available from Columbian: Raven 7000, Raven 5750, Raven 5250, Raven 5000, and Raven 3500. The following pigments are available from Degussa: Color Black FW 200, Color Black FW 2, Color Black FW 2V, Color Black FW 1, Color Black FW 18, Color Black S 160, Color Black S 170, Special Black 6, Special Black 5, Special Black 4A, Special Black 4, Printex U, Printex V, Printex 140U, and Printex 140V. The following pigment is available from DuPont: Tipure® R-101. The following pigments are available from Heubach: Dalamar® Yellow YT-858-D and Heucophthal® Blue G XBT-583D. The following pigments are available from Hoechst: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B. The following pigments are available from Mobay: Quindo® Magenta, Indofast® Brilliant Scarlet, Quindo® Red R6700, Quindo® Red R6713, and Indofast® Violet. The following pigments are available from Sun Chem: L74-1357 Yellow, L75-1331 Yellow, and L75-2577 Yellow.

All concentrations herein are expressed in weight percentages, unless otherwise indicated. The purity of all components is that employed in normal commercial practice for ink-jet inks. All references cited herein are hereby incorporated by reference.

Vehicles—The ink comprises the pigment colorant plus a vehicle. A typical formulation for an ink useful in the practice of the invention includes the pigment (about 0.5 to 20 wt %), one or more cosolvents (0 to about 50 wt %), one or more water-soluble surfactants/amphiphiles (0 to about 40 wt %), one or more high molecular weight colloids (0 to about 3 wt %), and water (balance). The term "grinding fluid" as used herein is meant to encompass the various components listed below and which are conventionally included in premix solutions used to grind or mill pigments.

One or more cosolvents may be added to the vehicle in the formulation of the ink. Classes of cosolvents employed in the practice of this invention include, but are not limited to, aliphatic alcohols, aromatic alcohols, diols, glycol ethers, poly(glycol) ethers, caprolactams, formamides, acetamides, and long chain alcohols. Examples of compounds employed in the practice of this invention include, but are not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,5-alcohols of 30 carbons or less, ethylene glycol alkyl ethers, propylene glycol alkyl ethers, poly(ethylene glycol) alkyl ethers, higher homologs of poly(ethylene glycol) alkyl ethers, poly (propylene glycol) alkyl ethers, higher homologs of poly (propylene glycol) alkyl ethers, N-alkyl caprolactams, unsubstituted caprolactams, substituted formamides, unsubstituted formamides, substituted acetamides, and unsubstituted acetamides. Specific examples of cosolvents that are preferably employed in the practice of this invention include, but are not limited to, 1,5-pentanediol, 2-pyrrolidone, 2-ethyl-2-hydroxymethyl-1,3-propanediol, diethylene glycol, 3-methoxybutanol, and 1,3-dimethyl-2-imidazolidinone. The cosolvent concentration may range from 0 to about 50 wt %, with about 0.1 to 15 wt % being preferred.

Water-soluble surfactants may be employed in the formulation of the vehicle of the ink. For convenience, examples of surfactants are divided into two categories: (1) non-ionic and amphoteric and (2) ionic. The former class includes: TERGITOLs, which are alkyl polyethylene oxides available from Union Carbide; TRITONs, which are alkyl phenyl polyethylene oxide surfactants available from Rohm & Haas Co.; BRIJs; PLURONICs (polyethylene oxide block copolymers); and SURFYNOLs (acetylenic polyethylene oxides available from Air Products); POE (polyethylene oxide) esters; POE diesters; POE amines; protonated POE amines; POE amides; and dimethicone copolyols. Ionic surfactants such as substituted amine oxides are useful in the practice of this invention. U.S. Pat. No. 5,106,416, Bleed Alleviation Using Zwitterionic Surfactants and Cationic Dyes discloses more fully most of the surfactants listed above. The non-ionic amphiphiles/surfactants are more preferred than the ionic surfactants. Specific examples of amphiphiles/surfactants that are preferably employed in the practice of this invention include, but are not limited to, isohexadecyl ethylene oxide 20, SURFYNOL CT-111, TERGITOL 15-S-7, and amine oxides, such as N,N-dimethyl-N-docecyl amine oxide, N,N-dimethyl-N-tetradecyl amine oxide, N,N-dimethyl-N-hexadecyl amine oxide, N,N-dimethyl-N-octadecyl amine oxide, and N,N-dimethyl-N-(Z-9-octadecenyl)-N-amine oxide. The concentration of the amphiphiles/surfactants may range from 0 to about 40 wt %, with 2.5 wt % being preferred.

Consistent with the requirements for this invention, various types of additives may be employed in the ink to optimize the properties of the ink composition for specific applications. For example, as is well-known to those skilled in the art, biocides may be used in the ink composition to inhibit growth of microorganisms, sequestering agents such as EDTA may be included to eliminate deleterious effects of heavy metal impurities, and buffer solutions may be used to control the pH of the ink. Other known additives such as viscosity modifiers and other acrylic or non-acrylic polymers may be added to improve various properties of the ink compositions as desired.

EXAMPLE I

Pigments are "ground or milled" until a desired average particle size is reached by using an acute pressure valve homogenizer and appropriate grinding fluid (mixture of solvents and dispersants to aid in grinding or milling). The process is done at a pressure of approximately 14,000 to 15,000 psi. However, any combination of operating pressures between about 10,000 and 30,000 psi and multiple passes through the homogenizer valve may be used to reach the desire particle size.

Once the pigments are at the appropriate particle size (see Example below for discussion of a method for determining if the pigments are of an acceptable size), solvents, surfactants, and other conventional ink-jet ink vehicle ingredients are added to the mixture of pigment and grinding fluid. The grinding process may be repeated until the resulting ink formulation is thoroughly mixed, or the combined mixtures mixed by any known mixer. Typically the pigment is less than or equal to about 0.5% to about 20 wt % of the final ink formula and is approximately 0.1 $\mu$m in size.

EXAMPLE II

Five hundred grams of a pigmented ink mixture is made containing the ingredients listed below. The ink is passed through an acute pressure valve homogenizer (APV, Rannie Corp.) at various pressures and multiple times. Forty ml of the homogenized ink is then filtered through a series of high precision filters (5 $\mu$m, 1.2 $\mu$m and 0.8 $\mu$m). The results tabulated below show that by using higher pressures to homogenize, fewer filters are required to filter the ink, thus indicating that fewer large particles are present. The chart also reflects that multiple passes also reduce the number of larger particles present.

High precision nylon filters, available from Micron Separations Inc. Westborough, Mass., are used to measure filter out unacceptably large particles in the ink. The fewer filters needed to filter a volume of ink is an accurate predictor that the ink will not clog the printer components, especially the printer nozzle

| Ink Mixture | Wt % |
|---|---|
| Arginine | 10 |
| Carbon Black FW18 | 10 |
| 1,5 pentanediol | 5 |
| Microbial agent | 00.5 |
| DI | 74.5 |
| Total | 100.0 |

| Homogenization pressure (psi) | Filter size ($\mu$m) | Number of filters used | Number of passes through Homogenizer |
|---|---|---|---|
| 10,000 | 5 | 11 | 10 |
| 10,000 | 1.2 | 6 | 10 |
| 10,000 | 0.8 | 2 | 10 |
| 14,500 | 5 | 8 | 10 |
| 14,500 | 1.2 | 4 | 10 |
| 14,500 | 0.8 | 1 | 10 |
| 14,500 | 5 | 3 | 20 |
| 14,500 | 1.2 | 2 | 20 |
| 14,500 | 0.8 | 1 | 20 |
| 14,500 | 5 | 2 | 30 |
| 14,500 | 1.2 | 1 | 30 |
| 14,500 | 0.8 | 1 | 30 |

INDUSTRIAL APPLICABILITY

The ink compositions of this invention are expected to find use in thermal ink-jet inks. Thus, there has been disclosed an ink-jet ink which includes a pigment derived by treating the pigment by an acute pressure valve homogenization process. It will be readily apparent to those skilled in this art that various changes and modifications of an obvious nature may be made, and all such changes and modifications are considered to fall within the scope of the invention.

What is claimed is:

1. An ink-jet ink for ink-jet printing which comprises:
   (a) a vehicle, and
   (b) a pigment, wherein said pigment has been homogenized by forcing the pigment through an acute pressure valve homogenizer to produce an average pigment size of below about 0.1 $\mu$m.

2. An ink-jet ink for ink-jet printing according to claim 1 wherein the pigment is introduced into the homogenizing valve at a pressure of from about 10,000 psi to about 30,000 psi.

3. An ink-jet ink for ink-jet printing according to claim 2 wherein the pigment is introduced into the homogenizing valve at a pressure of from about 13,000 psi to about 29,000 psi.

4. An ink-jet ink for ink-jet printing according to claim 2 wherein the pigment is introduced into the homogenizing valve at a pressure of from about 14,000 psi to about 15,000 psi.

5. An ink-jet ink for ink-jet printing according to claim 1 wherein the ink vehicle is mixed with the pigment before homogenization.

6. An ink-jet ink for ink-jet printing according to claim 1 wherein said pigment is passed multiple times through the homogenizer.

7. An ink-jet ink for ink-jet printing according to claim 6 wherein said pigment is passed from about 20 to about 30 times through the homogenizer.

8. A method for homogenizing an ink-jet ink comprising the steps of:
   (a) formulating a mixture of vehicle and pigment, and
   (b) forcing the pigment mixture through an acute pressure valve homogenizer.

9. A method for homogenizing an ink-jet ink according to claim 8 wherein the pigment mixture in step 2 is introduced into the homogenizing valve at a pressure of from about 10,000 psi to about 30,000 psi.

10. A method for homogenizing an ink-jet ink according to claim 9 wherein the pigment mixture in step 2 is introduced into the homogenizing valve at a pressure of from about 13,000 psi to about 29,000 psi.

11. A method for homogenizing an ink-jet ink according to claim 8 wherein step b) is repeated multiple times to produce an average pigment size of below about 0.1 $\mu$m.

12. A method for homogenizing an ink-jet ink according to claim 11 wherein step b) is repeated from about 20 to about 30 times.

13. A method for homogenizing an ink-jet ink according to claim 11 further comprising the step of cooling the ink mixture between repeating the homogenization step.

14. A method for homogenizing an ink-jet ink according to claim 8 further comprising the step of determining the end of the homogenization treatment by filtering the ink through high precision filters.

* * * * *